United States Patent
Yamada et al.

(10) Patent No.: US 9,252,412 B2
(45) Date of Patent: Feb. 2, 2016

(54) MULTILAYER POROUS FILM, SEPARATOR FOR NONAQUEOUS ELECTROLYTE SECONDARY BATTERIES, AND NONAQUEOUS ELECTROLYTE SECONDARY BATTERY

(71) Applicant: MITSUBISHI PLASTICS, INC., Chiyoda-ku (JP)

(72) Inventors: Hiroto Yamada, Nagahama (JP); Tomoyuki Nemoto, Nagahama (JP)

(73) Assignee: MITSUBISHI PLASTICS, INC., Chiyoda-ku (JP)

( * ) Notice: Subject to any disclaimer, the term of this patent is extended or adjusted under 35 U.S.C. 154(b) by 0 days.

(21) Appl. No.: 14/236,010

(22) PCT Filed: Mar. 15, 2013

(86) PCT No.: PCT/JP2013/057378
§ 371 (c)(1),
(2) Date: Jan. 29, 2014

(87) PCT Pub. No.: WO2013/146342
PCT Pub. Date: Oct. 3, 2013

(65) Prior Publication Data
US 2014/0193692 A1 Jul. 10, 2014

(30) Foreign Application Priority Data
Mar. 26, 2012 (JP) .................................. 2012-070032

(51) Int. Cl.
*H01M 2/16* (2006.01)
*H01M 10/42* (2006.01)
(Continued)

(52) U.S. Cl.
CPC ............. *H01M 2/1653* (2013.01); *B32B 27/08* (2013.01); *B32B 27/20* (2013.01); *B32B 27/32* (2013.01);
(Continued)

(58) Field of Classification Search
None
See application file for complete search history.

(56) References Cited

U.S. PATENT DOCUMENTS

2006/0105245 A1* 5/2006 Ikuta et al. .................... 429/246
2010/0159318 A1 6/2010 Sato et al.
(Continued)

FOREIGN PATENT DOCUMENTS

| JP | 2000-30686 A | 1/2000 |
|---|---|---|
| JP | 2004 227972 | 8/2004 |

(Continued)

OTHER PUBLICATIONS

Written Opinion issued Apr. 9, 2013 in PCT/JP2013/057378 (submitting English translation only).
(Continued)

*Primary Examiner* — Sarah A Slifka
(74) *Attorney, Agent, or Firm* — Oblon, McClelland, Maier & Neustadt, L.L.P.

(57) ABSTRACT

Provided is a multilayer porous film that has extremely high powder fall-off resistance and superior electrolyte solution adsorptivity and heat resistance and exhibits superior properties when used as a battery separator without decreasing the high air permeability of a porous film. The multilayer porous film includes a polyolefin-based resin porous film and a coating layer containing a filler and a resin binder on at least one surface of the polyolefin-based resin porous film. The amount of particles with particle sizes of less than 0.2 μm ($D_{0.2}$) in the filler is 1% or more, and the specific surface area of the filler is 5 m²/g or more and less than 10 m²/g. The multilayer porous film satisfies a particular condition.

18 Claims, 3 Drawing Sheets

(51) Int. Cl.
  *B32B 27/32* (2006.01)
  *B32B 27/08* (2006.01)
  *B32B 27/20* (2006.01)
  *H01M 10/052* (2010.01)

(52) U.S. Cl.
  CPC .......... *H01M 2/1626* (2013.01); *H01M 2/1646* (2013.01); *H01M 2/1666* (2013.01); *H01M 2/1686* (2013.01); *H01M 10/4235* (2013.01); *H01M 10/052* (2013.01); *Y10T 428/249991* (2015.04)

(56) References Cited

U.S. PATENT DOCUMENTS

| | | |
|---|---|---|
| 2010/0285348 A1 | 11/2010 | Murata et al. |
| 2012/0231323 A1 | 9/2012 | Takagi et al. |
| 2013/0034769 A1 | 2/2013 | Takagi et al. |
| 2013/0143095 A1 | 6/2013 | Takagi et al. |
| 2014/0099530 A1 | 4/2014 | Yamada et al. |

FOREIGN PATENT DOCUMENTS

| | | |
|---|---|---|
| JP | 2008 186721 | 8/2008 |
| JP | 2008 186722 | 8/2008 |
| JP | 2008 311221 | 12/2008 |
| JP | 2010 065088 | 3/2010 |
| JP | 2010 123383 | 6/2010 |
| JP | 2011 65850 | 3/2011 |
| JP | 2012-20437 A | 2/2012 |
| JP | 2012-54230 A | 3/2012 |
| WO | 2008 149986 | 12/2008 |

OTHER PUBLICATIONS

International Searcher Report Issued Apr. 9, 2013 in PCT/JP13/057378 filed Mar. 15, 2013.
Chinese Office Action issued Oct. 28, 2014 in Chinese Patent Application No. 201380002449.5.
U.S. Appl. No. 14/398,585, filed Nov. 3, 2014, Yamada, et al.

* cited by examiner (A)

(B)

MULTILAYER POROUS FILM, SEPARATOR FOR NONAQUEOUS ELECTROLYTE SECONDARY BATTERIES, AND NONAQUEOUS ELECTROLYTE SECONDARY BATTERY

CROSS REFERENCE TO RELATED APPLICATIONS

The present application is a 35 U.S.C. §371 national stage patent application of International patent application PCT/JP2013/057378, filed on Mar. 15, 2013, published as WO/2013/146342 on Oct 3, 2013, the text of which is incorporated by reference, and claims the benefit of the filing date of Japanese application no. 2012-070032, filed on Mar. 26, 2012, the text of which is also incorporated by reference.

FIELD OF INVENTION

The present invention relates to multilayer porous films that can be used for packaging, hygiene, animal husbandry, agriculture, architecture, medicine, separation membranes, light diffusers, and battery separators, and particularly to multilayer porous films suitable for use as separators for nonaqueous electrolyte secondary batteries. The present invention also relates to separators for nonaqueous electrolyte secondary batteries and nonaqueous electrolyte secondary batteries using such multilayer porous films.

BACKGROUND OF INVENTION

Porous polymers having numerous fine interconnected pores are used in various fields, including separation membranes used for applications such as the manufacture of ultrapure water, the purification of chemicals, and water treatment; breathable waterproof films used for products such as clothing and sanitary materials; and separators used for batteries such as secondary batteries.

Secondary batteries are widely used as power supplies for OA, FA, household electrical devices, and portable devices such as communication devices. In particular, portable devices that use lithium-ion secondary batteries are becoming widespread because these batteries provide high volume efficiency when mounted on devices and thus contribute to a reduction in device size and weight. Large secondary batteries, on the other hand, have been researched and developed in many fields related to energy and environmental issues, including load leveling, UPS, and electric vehicles and lithium-ion secondary batteries, which are a type of nonaqueous electrolyte secondary battery, have been used in a wide range of applications because these batteries provide high capacity, high power, high voltage, and high long-term storage stability.

The operating voltage of lithium-ion secondary batteries is typically up to 4.1 to 4.2 V. For such high voltages, aqueous solutions cannot be used as electrolyte solutions because electrolysis occurs. Accordingly, electrolyte solutions that use organic solvents, i.e., nonaqueous electrolyte solutions, have been used as electrolyte solutions resistant to high voltages. Solvents used for nonaqueous electrolyte solutions include high-dielectric-constant organic solvents, which allow more lithium ions to be present therein, and typical high-dielectric-constant organic solvents are organic carbonate ester compounds such as propylene carbonate and ethylene carbonate. Also, a highly reactive electrolyte, such as lithium hexafluorophosphate, dissolved in a solvent is used as a support electrolyte, which serves as a lithium ion source.

To prevent an internal short circuit, a lithium-ion secondary battery includes a separator disposed between a positive electrode and a negative electrode. The separator requires insulating properties because of its role. The separator also requires air permeability to provide channels for lithium ions and a fine porous structure to provide the function of diffusing and retaining the electrolyte solution. To meet these requirements, a porous film is used as the separator.

Battery safety has become increasingly important with the increasing battery capacity in recent years. Among the characteristics that contribute to the safety of battery separators are shutdown characteristics (hereinafter referred to as "SD characteristics"). SD characteristics refer to the function of closing fine pores in the porous film at high temperatures, i.e., about 100° C. to 150° C., to shut off ion conduction inside the battery, thereby preventing a further rise in the internal temperature of the battery. The lowest temperature at which the fine pores in the porous film are closed is referred to as shutdown temperature (hereinafter referred to as "SD temperature"). Porous films require SD characteristics when used as battery separators.

However, with the increasing energy density and capacity of lithium-ion secondary batteries in recent years, accidents have occurred in which, because the normal shutdown function does not work sufficiently, the internal battery temperature rises above about 130° C., which is the melting point of polyethylene, a material for battery separators, and failure of the separator due to thermal shrinkage causes a short circuit between the two electrodes and eventually leads to a fire. Accordingly, to ensure safety, there is a need for a separator having a higher heat resistance than those having the current SD characteristics.

To meet the need, multilayer porous films have been proposed that include a polyolefin-based resin porous film and a porous layer containing inorganic fine particles such as metal oxide particles and a resin binder on at least one surface of the polyolefin-based resin porous film (Patent Documents 1 to 3). These porous films are reported to provide extremely high safety because a coating layer heavily filled with inorganic fine particles such as α-alumina prevents a short circuit between the two electrodes even if the temperature continues to rise above the SD temperature in the event of abnormal heat generation.

LIST OF DOCUMENTS

Patent Documents

Patent Document 1: Japanese Patent Publication 2004-227972 A

Patent Document 2: Japanese Patent Publication 2008-186721 A

Patent Document 3: WO 2008/149986

OBJECT AND SUMMARY OF INVENTION

Problems to be Solved

The methods disclosed in Patent Documents 1 to 3, however, typically use an extremely large amount of inorganic fine particles relative to the amount of resin binder. Although this provides high air permeability, a problem arises in that when multilayer porous films manufactured by these methods are transported, for example, in the manufacturing line, the inorganic fine particles may come off (powder fall-off) and contaminate the manufacturing line.

The known art also does not take into account moderate electrolyte solution adsorptivity, which is required when the multilayer porous films are incorporated into batteries as separators for nonaqueous electrolyte secondary batteries. Specifically, a separator for nonaqueous electrolyte secondary batteries with superior electrolyte solution adsorptivity is preferred for reasons of productivity because the electrolyte solution can quickly permeate the separator during the assembly of batteries, whereas a separator with excessive electrolyte solution adsorptivity significantly decreases the battery capacity when incorporated into nonaqueous electrolyte secondary batteries. Thus, separators require moderate electrolyte solution adsorptivity, although the known art does not take into account such moderate electrolyte solution adsorptivity.

An object of the present invention is to solve the foregoing problems. Specifically, an object of the present invention is to provide a multilayer porous film that has extremely high powder fall-off resistance and superior electrolyte solution adsorptivity and heat resistance and exhibits superior properties when used as a battery separator without decreasing the high air permeability of a polyolefin-based resin porous film.

SUMMARY OF INVENTION

A multilayer porous film of the present invention includes a polyolefin-based resin porous film and a coating layer containing a filler and a resin binder on at least one surface of the polyolefin-based resin porous film. The amount of particles with particle sizes of less than 0.2 μm ($D_{0.2}$) in the filler is 1% or more, and the specific surface area of the filler is 5 $m^2/g$ or more and less than 10 $m^2/g$. The multilayer porous film satisfies the below condition (1):

Condition (1): After the multilayer porous film is cut to a size of 50 mm×50 mm and is stuck on thick paper in a state where the coating layer faces upward, a column-shaped weight having a diameter of 40 mm and a weight of 700 g and covered with a cotton cloth on an entire bottom surface thereof is placed on the coating layer, and the weight is rotated at a rotational speed of 50 rpm for 10 minutes to rub the surface of the coating layer, observation of the surface of the coating layer shows that the coating layer has a missing portion with an area of less than 10% of the contact area of the weight.

In the multilayer porous film of the present invention, the filler is preferably a metal oxide.

In the multilayer porous film of the present invention, the resin binder is preferably at least one member selected from the group consisting of polyvinyl alcohol, polyvinylidene fluoride, carboxymethyl cellulose, polyacrylic acid, and polyacrylic acid derivatives.

In the multilayer porous film of the present invention, the content of the filler to the total amount of filler and resin binder in the coating layer is preferably 80% to 99.9% by mass.

In the multilayer porous film of the present invention, the polyolefin-based resin porous film preferably contains a polypropylene-based resin.

In the multilayer porous film of the present invention, the polyolefin-based resin porous film preferably has β-crystal activity.

In the multilayer porous film of the present invention, the coating layer is preferably formed on the polyolefin-based resin porous film by applying a dispersion for forming the coating layer.

In the multilayer porous film of the present invention, a dispersion medium in the dispersion for forming the coating layer preferably contains water as a major component.

A separator of the present invention for nonaqueous electrolyte secondary batteries is made of the multilayer porous film of the present invention.

A nonaqueous electrolyte secondary battery of the present invention includes the separator of the present invention for nonaqueous electrolyte secondary batteries.

ADVANTAGEOUS EFFECTS OF INVENTION

According to the present invention, a multilayer porous film can be provided that has extremely high powder fall-off resistance and superior electrolyte solution adsorptivity and heat resistance and exhibits superior properties when used as a separator for nonaqueous electrolyte secondary batteries without decreasing the high air permeability of a polyolefin-based resin porous film.

DESCRIPTION OF EMBODIMENTS

Figure 1:
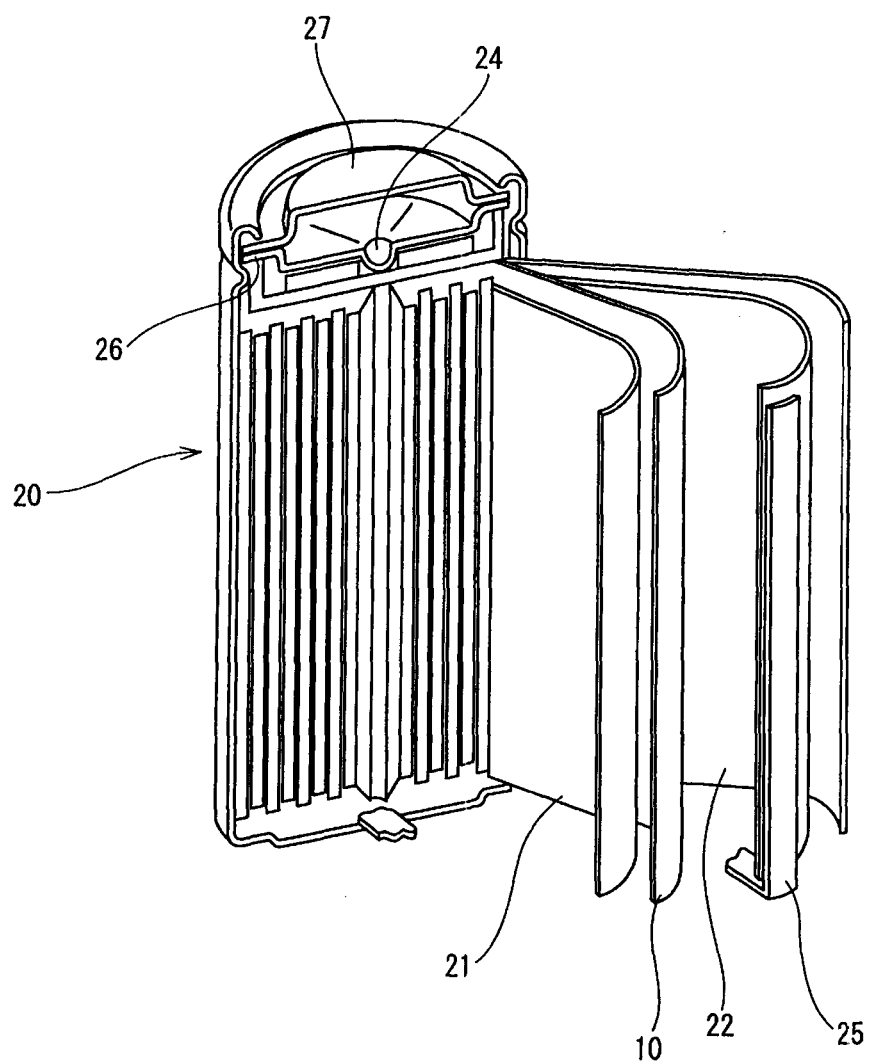
FIG. 1 is a schematic sectional view of a battery including a multilayer porous film of the present invention.

Embodiments of multilayer porous films, separators for nonaqueous electrolyte secondary batteries, and nonaqueous electrolyte secondary batteries of the present invention will now be described in detail.

In the present invention, the expression "major component" is meant to permit other components to be present in amounts that do not interfere with the function of the major component unless otherwise stated. Although this expression does not specify the content of the major component, it is meant to include an amount of 50% by mass or more, preferably 70% by mass or more, particularly preferably 90% by mass or more (including 103%), of the composition.

The term "X to Y" (where X and Y are any number) encompasses "not less than X and not more than Y" as well as "preferably more than X" and "preferably less than Y" unless otherwise stated.

Multilayer Porous Film

The individual components of the multilayer porous film of the present invention will now be described.

Polyolefin-Based Resin Porous Film

Examples of polyolefin-based resins used for the polyolefin-based resin porous film include homopolymers and copolymers of α-olefins such as ethylene, propylene, 1-butene, 4-methyl-1-pentene, and 1-hexene. Two or more of these homopolymers and copolymers may be mixed together. Among these, polypropylene-based resins and polyethylene-based resins are preferred, and polypropylene-based resins are particularly preferred to maintain the properties such as mechanical strength and heat resistance of the multilayer porous film of the present invention.

Polypropylene-Based Resin

Examples of polypropylene-based resins used in the present invention include homopolypropylene (propylene homopolymer) and random copolymers and block copolymers of propylene with α-olefins such as ethylene, 1-butene, 1-pentene, 1-hexene, 1-heptene, 1-octene, 1-nonene, and 1-decene. Among these, homopolypropylene is more preferred to maintain the properties such as mechanical strength and heat resistance of the multilayer porous film of the present invention.

It is preferred to use a polypropylene-based resin with an isotactic pentad fraction (mmmm fraction), which indicates tacticity, of 80% to 99%, more preferably 83% to 98%, even more preferably 85% to 97%. If the isotactic pentad fraction is too low, the film may have low mechanical strength. Although the upper limit of the isotactic pentad fraction is set to the upper limit industrially feasible at present, it does not apply if a resin with a higher tacticity is developed at an industrial level in future.

The isotactic pentad fraction (mmmm fraction) refers to the three-dimensional structure, or the proportion thereof, in which five methyl side groups in a main chain of any five successive propylene units joined by carbon-carbon bonds are all positioned in the same direction. Assignment of signals to the methyl regions is based on A. Zambelli et al (Macromolecules 8, 687, (1975)).

It is preferred to use a polypropylene-based resin with an Mw/Mn, which is a parameter indicating molecular weight distribution, of 2.0 to 10.0, more preferably 2.0 to 8.0, even more preferably 2.0 to 6.0. Although a lower Mw/Mn indicates a narrower molecular weight distribution, a polypropylene-based resin having an Mw/Mn of less than 2.0 has problems such as decreased moldability in extrusion molding and is also difficult to produce industrially. A polypropylene-based resin having an Mw/Mn of more than 10.0 contains a large amount of low-molecular-weight component, which tends to decrease the mechanical strength of the multilayer porous film. The Mw/Mn is determined by gel permeation chromatography (GPC).

The melt flow rate (MFR) of the polypropylene-based resin is typically preferably, but not limited to, 0.5 to 15 g/10 min, more preferably 1.0 to 10 g/10 min. A polypropylene-based resin having an MFR of 0.5 g/10 min or more exhibits high melt viscosity during molding and thus ensures sufficient productivity. A polypropylene-based resin having an MFR of 15 g/10 min or less provides a multilayer porous film with sufficient mechanical strength. The MFR of the polypropylene-based resin is measured at a temperature of 230° C. and a load of 2.16 kg in accordance with JIS K7210.

Examples of methods for manufacturing the polypropylene-based resin include, but not limited to, known polymerization methods using known olefin polymerization catalysts, including slurry polymerization, melt polymerization, bulk polymerization, and vapor-phase polymerization using multi-site catalysts such as Ziegler-Natta catalysts or single-site catalysts such as metallocene catalysts, and bulk polymerization using radical initiators.

Examples of commercially available polypropylene-based resins include the trade names "NOVATEC-PP" and "WINTEC" (available from Japan Polypropylene Corporation), "NOTIO" and "TAFMER XR" (available from Mitsui Chemicals, Inc.), "ZELAS" and "THERMORUN" (available from Mitsubishi Chemical Corporation), "SUMITOMO NOBLEN" and "TAFTHREN" (available from Sumitomo Chemical Co., Ltd.), "Prime Polypro" and "Prime TPO" (available from Prime Polymer Co., Ltd.), "Adflex", "Adsyl", and "HMS-PP (PF814)" (available from SunAllomer Ltd.), and "VERSIFY" and "INSPIRE" (available from Dow Chemical Company).

Polyethylene-Based Resin

Examples of polyethylene-based resins used in the present invention include low-density polyethylene, linear low-density polyethylene, linear ultralow-density polyethylene, medium-density polyethylene, high-density polyethylene, and ethylene-based copolymers containing ethylene as a major component, i.e., copolymers and multi-component copolymers, as well as mixtures thereof, of ethylene with one or more comonomers selected from α-olefins having 3 to 10 carbon atoms, such as propylene, butene-1, pentene-1, hexene-1, heptene-1, and octene-1; vinyl esters such as vinyl acetate and vinyl propionate; unsaturated carboxylic acid esters such as methyl acrylate, ethyl acrylate, methyl methacrylate, and ethyl methacrylate; and unsaturated compounds such as conjugated dienes and nonconjugated dienes. The ethylene-based copolymers typically contain more than 50% by mass of ethylene units.

Among these polyethylene-based resins, it is preferred to use at least one polyethylene-based resin selected from low-density polyethylene, linear low-density polyethylene, and high-density polyethylene, more preferably high-density polyethylene.

The density of the polyethylene-based resin is preferably 0.910 to 0.970 g/cm$^3$, more preferably 0.930 to 0.970 g/cm$^3$, even more preferably 0.940 to 0.970 g/cm$^3$. A polyethylene-based resin having a density of 0.910 g/cm$^3$ or more is preferred because it provides appropriate SD characteristics. A polyethylene-based resin having a density of 0.970 g/cm$^3$ or less is preferred because it provides appropriate SD characteristics while maintaining its stretchability.

The density of the polyethylene-based resin can be measured by the density gradient tube method in accordance with JIS K7112.

The melt flow rate (MFR) of the polyethylene-based resin is typically preferably, but not limited to, 0.03 to 30 g/10 min, more preferably 0.3 to 10 g/10 min. A polyethylene-based resin having an MFR of 0.03 g/10 min or more is preferred because it exhibits sufficiently low melt viscosity during molding and thus provides superior productivity. A polyethylene-based resin having an MFR of 30 g/10 min or less is preferred because it provides sufficient mechanical strength.

The MFR of the polyethylene-based resin is measured at a temperature of 190° C. and a load of 2.16 kg in accordance with JIS K7210.

Examples of methods for manufacturing the polyethylene-based resin include, but not limited to, known polymerization methods using known olefin polymerization catalysts, including polymerization methods using multi-site catalysts such as Ziegler-Natta catalysts or single-site catalysts such as metallocene catalysts. Examples of polymerization methods for the polyethylene-based resin include one-step polymerization, two-step polymerization, and multi-step polymerization, and a polyethylene-based resin manufactured by any method can be used.

β-Crystal Activity

The polyolefin-based resin porous film used for the multilayer porous film of the present invention preferably has β-crystal activity. β-Crystal activity can be considered as a measure indicating that β-crystals are formed in an unstretched film. If β-crystals are formed in an unstretched film, fine pores are readily formed by stretching without using an additive such as a filler, thus providing a multilayer porous film with air permeation properties.

If, for example, a layer containing a polypropylene-based resin is formed in addition to the polypropylene-based resin layer, it is preferred that both layers have β-crystal activity.

The multilayer porous film of the present invention is determined to have "β-crystal activity" if a crystal melting peak temperature derived from β-crystals is detected by a differential scanning calorimeter, described later, and/or if a diffraction peak derived from β-crystals is detected by an X-ray diffractometer, described later.

The determination of β-crystal activity of the multilayer porous film of the present invention can be performed with all layers included therein.

The determination of the presence or absence of β-crystal activity in the case where the polyolefin-based resin used for the polyolefin-based resin porous film is a polypropylene-based resin is specifically illustrated below.

(1) Determination by Differential Scanning Calorimeter

In this case, the multilayer porous film is determined to have β-crystal activity if a crystal melting peak temperature (Tmβ) derived from β-crystals of the polypropylene-based resin is detected by a differential scanning calorimeter when the multilayer porous film is heated from 25° C. to 240° C. at a heating rate of 10° C./min and maintained at this temperature for 1 minute, is cooled from 240° C. to 25° C. at a cooling rate of 10° C./min and maintained at this temperature for 1 minute, and is reheated from 25° C. to 240° C. at a heating rate of 10° C./min.

The degree of β-crystal activity of the multilayer porous film is calculated from the heat of crystal melting (ΔHmα) detected that is derived from α-crystals of the polypropylene-based resin and the heat of crystal melting (ΔHmβ) detected that is derived from β-crystals of the polypropylene-based resin by the following equation:

Degree of β-crystal activity(%)=[ΔHmβ/(ΔHmβ+ΔHmα)]×100

For example, if the polypropylene-based resin is homopolypropylene, the degree of β-crystal activity can be calculated from the heat of crystal melting (ΔHmβ) derived from β-crystals that is detected mainly in the range from 145° C. to lower than 160° C. and the heat of crystal melting (ΔHmα) derived from α-crystals that is detected mainly in the range from 160° C. to 170° C. Alternatively, for example, if the polypropylene-based resin is a random polypropylene copolymerized with 1% to 4% by mole of ethylene, the degree of β-crystal activity can be calculated from a heat of crystal melting (ΔHmβ) derived from α-crystals that is detected mainly in the range from 120° C. to lower than 140° C. and a heat of crystal melting (ΔHmα) derived from α-crystals that is detected mainly in the range from 140° C. to 165° C.

It is preferred to use a polyolefin-based resin porous film having a high degree of β-crystal activity, specifically, 20% or more, more preferably 40% or more, particularly preferably 60% or more. If the polyolefin-based resin porous film has a degree of β-crystal activity of 20% or more, a large amount of β-crystals of the polypropylene-based resin can be formed in an unstretched film, and numerous fine uniform pores are formed by stretching, thus providing a battery separator with high mechanical strength and superior air permeation performance.

Although there is no upper limit to the degree of β-crystal activity, it is preferably as close to 100% as possible because a higher degree of β-crystal activity makes the above advantage more effective.

(2) Determination by X-Ray Diffractometer

To determine the presence or absence of β-crystal activity from a diffraction profile obtained by wide-angle X-ray diffractometry of a multilayer porous film subjected to particular heat treatment, specifically, a multilayer porous film heat-treated at 170° C. to 190° C., which exceeds the melting point of the polypropylene-based resin, and gradually cooled to form and grow β-crystals is analyzed by wide-angle X-ray diffractometry and is determined to have β-crystal activity if a diffraction peak derived from the (300) plane of β-crystals of the polypropylene-based resin is detected in the range 2θ=16.0° to 16.5°.

For details of the β-crystal structure and wide-angle X-ray diffraction of polypropylene-based resins, reference may be made to Macromol. Chem. 187, 643-652 (1986), Prog. Polym. Sci. Vol. 16, 361-404 (1991), Macromol. Symp. 89, 499-511 (1995), Macromol. Chem. 75, 134 (1964), and the references cited therein. A detailed method for evaluating β-crystal activity by wide-angle X-ray diffraction will be presented in the Examples described later.

Examples of methods for inducing β-crystal activity, described above, include the exclusion of substances that promote the formation of α-crystals of the polypropylene-based resin, the use of a polypropylene-based resin subjected to treatment that forms peroxide radicals, as disclosed in Japanese Patent No. 3739481, and the addition of a β-crystal nucleating agent to the composition.

β-Crystal Nucleating Agent

Examples of β-crystal nucleating agents used in the present invention include the following compounds, although any compound may be used that promotes the formation aid growth of β-crystals of the polypropylene-based resin, and such compounds may be used alone or as a mixture of two or more.

Examples of β-crystal nucleating agents include amide compounds; tetraoxaspiro compounds; quinacridones; nano-sized iron oxide; alkali and alkaline earth metal salts of carboxylic acids, such as potassium 1,2-hydroxystearate, magnesium benzoate, magnesium succinate, and magnesium phthalate; aromatic sulfonate compounds such as sodium benzenesulfonate and sodium naphthalenesulfonate; di- and triesters of di- and tribasic carboxylic acids; phthalocyanine pigments such as phthalocyanine blue; binary compounds composed of a component A that is an organic dibasic acid and a component B that is an oxide, hydroxide, or salt of a group 2 metal of the periodic table; and compositions composed of a cyclic phosphorus compound and a magnesium compound. Other specific types of nucleating agents are disclosed in Japanese Unexamined Patent Application Publication Nos. 2003-306585, 08-144122, and 09-194650.

Examples of commercially available β-crystal nucleating agents include "NJSTAR NU-100", a β-crystal nucleating agent available from New Japan Chemical Co., Ltd. Examples of polypropylene-based resins containing a β-crystal nucleating agent include "Bepol B-022SP", a polypropylene available from Aristech, "Beta(β)-PP BE60-7032", a polypropylene available from Borealis, and "BNX BETAPP-LN", a polypropylene available from Mayzo.

The amount of β-crystal nucleating agent added to the polyolefin-based resin needs to be adjusted depending on, for example, the type of β-crystal nucleating agent and the composition of the polyolefin-based resin. Preferably, the β-crystal nucleating agent is added to the polyolefin-based resin in an amount of 0.0001 to 5 parts by mass, more preferably 0.001 to 3 parts by mass, even more preferably 0.01 to 1 part by mass, based on 100 parts by mass of the polyolefin-based resin that forms the polyolefin-based resin porous film. Addition of the β-crystal nucleating agent to the polyolefin-based resin in an amount of 0.0001 part by mass or more allows a sufficient amount of β-crystals of the polyolefin-based resin to form and grow during manufacture and ensures sufficient β-crystal activity when the multilayer porous film is used as a separator, thus providing the desired air permeation performance. Addition of the β-crystal nucleating agent in an amount of 5 parts by mass or less is preferred because it is economically advantageous and does not cause problems such as bleeding of the β-crystal nucleating agent to the surface of the polyolefin-based resin porous film.

Other Components

In the present invention, in addition to the components described above, additives that are commonly added to resin compositions may optionally be added to the polyolefin-based resin porous film in amounts that do not significantly interfere with the advantages of the present invention. Examples of such additives include recycled resins such as those produced by trimming loss at edges, which are added to improve and adjust the moldability, productivity, and various material properties of the polyolefin-based resin porous film; inorganic particles such as silica, talc, kaolin, and calcium carbonate; pigments such as carbon black; and other additives such as flame retardants, weathering stabilizers, heat stabilizers, antistatic agents, melt viscosity modifiers, crosslinking agents, lubricants, nucleating agents, plasticizers, antiaging agents, antioxidants, light stabilizers, ultraviolet absorbers, neutralizing agents, defogging agents, antiblocking agents, slipping agents, and colorants.

To promote pore formation or impart moldability, modified polyolefin-based resins, aliphatic saturated hydrocarbon resins and modified products thereof, ethylene-based polymers, waxes, and low-molecular-weight polypropylene may be added in amounts that do not significantly interfere with the advantages of the present invention.

Layer Structure of Polyolefin-Based Resin Porous Film

In the present invention, the polyolefin-based resin porous film may be either a single-layer film or a multilayer film and is not limited to any particular layer structure. In particular, the polyolefin-based resin porous film is preferably a single-layer film of a layer containing the polyolefin-based resin (hereinafter also referred to as "A layer") or a multilayer film of an A layer and another layer (hereinafter also referred to as "B layer") that does not interfere with the function of the A layer. For example, if the polyolefin-based resin porous film is used as a separator for nonaqueous electrolyte secondary batteries, a low-melting-point resin layer that closes its pores in a high-temperature atmosphere and thereby ensures battery safety may be stacked, as disclosed in Japanese Unexamined Patent Application Publication No. 04-181651.

Specifically, examples of layer structures include a double-layer structure in which an A layer and a B layer are stacked, a triple-layer structure in which an A layer, a B layer, and an A layer are stacked, and a triple-layer structure in which a B layer, an A layer, and a B layer are stacked. Also available is a triple-layer structure including three types of layers with different functions. In this case, layers with different functions may be stacked in any order. Optionally, more layers may be stacked, including four layers, five layers, six layers, and seven layers.

The material properties of the polyolefin-based resin porous film used in the present invention can be flexibly adjusted depending on the layer structure, the stacking ratio, the composition of each layer, and the method of manufacture.

Method for Manufacturing Polyolefin-Based Resin Porous Film

Next, a method for manufacturing the polyolefin-based resin porous film used in the present invention will be described, although the polyolefin-based resin porous film used in the present invention is not limited to the polyolefin-based resin porous film manufactured by this method of manufacture.

Specifically, a porous film with numerous fine pores having interconnectivity across the thickness thereof can be manufactured by melt-extruding the polyolefin-based resin to form a nonporous raw-film and then stretching the nonporous raw-film.

The nonporous raw-film may be formed by any known method. For example, the nonporous film may be formed by a method including melting a thermoplastic resin composition using an extruder, extruding the melt from a T-die, and solidifying the melt by cooling on a casting roller. Also applicable is a method including cutting a raw-film manufactured by the tubular method into a flat shape.

Pores may be formed in the nonporous raw-film by any known method, such as pore formation by wet stretching along one or more axes or pore formation by dry stretching along one or more axes. Examples of methods for stretching include roller stretching, rolling, tenter stretching, and simultaneous biaxial stretching. These methods are used alone or in a combination of two or more for uniaxial or biaxial stretching. In particular, sequential biaxial stretching is preferred for porous structure control. Optionally, a method including extracting the plasticizer from the polyolefin-based resin composition with a solvent and then drying the composition before or after stretching may be applied.

In the present invention, according to the order of steps such as pore formation and stacking, methods for manufacturing a polyolefin-based resin porous film having a multilayer structure are broadly classified into the following four methods:

(i) A method including forming pores in the individual layers and then stacking the layers in which pores are formed by lamination or using an adhesive;

(ii) A method including stacking the individual layers to form a multilayer nonporous raw-film and then forming pores in the multilayer nonporous raw-film;

(iii) A method including forming pores in one of the individual layers, stacking another nonporous film, and then forming pores; and (iv) A method including forming a porous layer and then applying, for example, inorganic or organic particles by coating or metal particles by evaporation to form a multilayer porous raw-film.

In the present invention, it is preferred to use method (ii) for process simplicity and productivity, and it is particularly preferred to use a method including forming a multilayer nonporous film by coextrusion and then forming pores to ensure sufficient adhesion between the two layers.

A detailed method for manufacturing the polyolefin-based resin porous film will now be described.

A mixed resin composition containing a polyolefin-based resin and optionally other thermoplastic resins and additives is first prepared. For example, raw materials such as a polypropylene-based resin, a β-crystal nucleating agent, and optionally other additives are mixed together, preferably in a mixer such as a Henschel mixer, super mixer, or tumbler mixer, or by blending all ingredients in a bag by hand. The mixture is then melt-compounded, for example, in a single- or twin-screw extruder or kneader, preferably a twin-screw extruder, and is cut into pellets.

The pellets are fed into an extruder and are extruded from a T-die extrusion die to form a raw-film. The T-die may be of any type. For example, if the polyolefin-based resin porous film used in the present invention has a multilayer structure including three layers of two types, the T-die may be of a multi-manifold type for forming three layers of two types or of a feedblock type for forming three layers of two types.

The gap of the T-die used is typically about 0.1 to 3.0 mm, preferably 0.5 to 1.0 mm, depending on various conditions such as the final film thickness required, the stretching conditions, and the draft ratio. A T-die having a gap of 0.1 mm or more is preferred for reasons of production speed, whereas a T-die having a gap of 3.0 mm or less is preferred for reasons of production stability because the draft ratio is moderate.

In extrusion molding, the extrusion temperature is generally preferably about 180° C. to 350° C., more preferably 200° C. to 330° C., even more preferably 220° C. to 300° C., depending on the properties such as flow characteristics and moldability of the resin composition. An extrusion temperature of 180° C. or higher is preferred for improved productivity because the melted resin exhibits sufficiently low viscosity and thus provides superior moldability. An extrusion temperature of 350° C. or lower prevents degradation of the resin composition and thus prevents a decrease in the mechanical strength of the resulting multilayer porous film.

The cooling/solidifying temperature of the casting roller is of great importance in the present invention; it may be controlled to adjust the fraction of β-crystals of the polyolefin-based resin in the raw-film. The cooling/solidifying temperature of the casting roller is preferably 80° C. to 150° C., more preferably 90° C. to 140° C., even more preferably 100° C. to 130° C. A cooling/solidifying temperature of 80° C. or higher is preferred because the fraction of β-crystals in the raw-film can be sufficiently increased. A cooling/solidifying temperature of 150° C. or lower is preferred because a raw-film can be efficiently formed without problems such as the extruded melted resin adhering to and being wound around the casting roller.

The fraction of β-crystals of the polyolefin-based resin in an unstretched raw-film is preferably adjusted to 30% to 100% by setting the temperature of the casting roller to the above range. More preferably, the fraction of β-crystals of the polyolefin-based resin in an unstretched raw-film is 40% to 100%, even more preferably 50% to 100%, most preferably 60% to 100%. If the fraction of β-crystals in an unstretched raw-film is 30% or more, pores can be readily formed by the subsequent stretching process, thus providing a polyolefin-based resin porous film with good air permeation properties.

The fraction of β-crystals in the unstretched raw-film is calculated from the heat of crystal melting ($\Delta Hm\alpha$) derived from α-crystals of the polyolefin-based resin and the heat of crystal melting ($\Delta Hm\beta$) derived from β-crystals of the polyolefin-based resin that are detected by a differential scanning calorimeter when the raw-film is heated from 25° C. to 240° C. at a heating rate of 10° C./min by the following equation:

$$\beta\text{-Crystal fraction}(\%)=[\Delta Hm\beta/(\Delta Hm\beta+\Delta Hm\alpha)]\times 100$$

The resulting nonporous raw-film is then stretched to form the film. The stretching step may be performed by uniaxial stretching, although at least biaxial stretching is more preferred. Biaxial stretching may be performed by simultaneous biaxial stretching or sequential biaxial stretching, although sequential biaxial stretching is more preferred because it facilitates selection of the stretching conditions (such as draw ratio and temperature) in each stretching step and thus facilitates porous structure control. The lengthwise direction of the raw film and the film is referred to as "longitudinal direction", and the direction perpendicular to the lengthwise direction is referred to as "lateral direction". Stretching in the lengthwise direction is referred to as "longitudinal stretching", and stretching in the direction perpendicular to the lengthwise direction is referred to as "lateral stretching".

The lengthwise direction is usually the direction in which the raw-film is extruded during the extrusion molding process.

For sequential biaxial stretching, the stretching temperature in longitudinal stretching is generally preferably controlled to 0° C. to 130° C., more preferably 10° C. to 120° C., even more preferably 20° C. to 110° C., although it needs to be changed depending on the properties such as composition, crystal melting peak temperature, and crystallinity of the resin composition used. The draw ratio in longitudinal stretching is preferably 2 to 10 times, more preferably 3 to 8 times, even more preferably 4 to 7 times. Longitudinal stretching within the above range allows a moderate number of pore origins to be formed while avoiding failure during stretching.

The stretching temperature in lateral stretching is generally 100° C. to 160° C., preferably 110° C. to 150° C., more preferably 120° C. to 140° C. The draw ratio in lateral stretching is preferably 1.2 to 10 times, more preferably 1.5 to 8 times, even more preferably 2 to 7 times. Lateral stretching within the above range allows the pore origins formed by longitudinal stretching to be moderately expanded to form a fine porous structure.

The stretching rate in the stretching step is preferably 500%/min to 12,000%/min, more preferably 1,500%/min to 10,000%/min, even more preferably 2,500%/min to 8,000%/min.

The polyolefin-based resin porous film thus prepared is preferably heat-treated for improved dimensional stability. The heat treatment temperature is preferably 100° C. or higher, more preferably 120° C. or higher, even more preferably 140° C. or higher, because heat treatment at such temperatures is effective in providing high dimensional stability. The heat treatment temperature is preferably 170° C. or lower, more preferably 165° C. or lower, even more preferably 160° C. or lower. A heat treatment temperature of 170° C. or lower is preferred because the polyolefin-based resin is not likely to melt during the heat treatment and thus maintains its porous structure. Optionally, the film may be relaxed by 1% to 20% during the heat treatment step.

After the heat treatment, the film is uniformly cooled and coiled to obtain a polyolefin-based resin porous film.

The thickness of the polyolefin-based resin porous film is set such that the multilayer porous film of the present invention has a suitable thickness while ensuring that the coating layer, described below, of the present invention has a suitable thickness.

Coating Layer

The multilayer porous film of the present invention includes a coating layer containing a filler and a resin binder on at least one surface of the polyolefin-based resin porous film.

Filler

The filler used in the present invention may be any filler, including inorganic fillers and organic fillers.

Specifically, examples of inorganic fillers that can be used in the present invention include metal carbonates such as calcium carbonate, magnesium carbonate, and barium carbonate; metal sulfates such as calcium sulfate, barium sulfate, and magnesium sulfate; metal oxides such as calcium oxide, magnesium oxide, zinc oxide, alumina, silica, and titanium oxide; metal chlorides such as sodium chloride, magnesium chloride, silver chloride, and calcium chloride; and clay minerals such as talc, clay, mica, and montmorillonite. In particular, if the multilayer porous film is used as a battery separator, metal oxides are more preferred because they are chemically inert when incorporated into batteries, and alumina is particularly preferred.

Examples of organic fillers that can be used in the present invention include fillers made of thermoplastic resins and thermosetting resins such as ultrahigh-molecular-weight polyethylene, polystyrene, polymethyl methacrylate, polycarbonate, polyethylene terephthalate, polybutylene terephthalate, polyphenylene sulfide, polysulfone, polyethersulfone, polyetheretherketone, polytetrafluoroethylene, polyimide, polyetherimide, melamine, and benzoguanamine. Among these, for example, crosslinked polystyrene is preferred for its resistance to swelling with electrolyte solution when the multilayer porous film of the present invention is used as a separator for nonaqueous electrolyte secondary batteries.

In the present invention, it is important that the amount of particles with particle sizes of less than 0.2 μm ($D_{0.2}$) in the filler be 1% or more, more preferably 5% or more, particularly preferably 10% or more. A $D_{0.2}$ of 1% or more allows for a significant reduction in the amount of filler coming off the coating layer, thus improving the powder fall-off resistance. Although there is no upper limit to $D_{0.2}$, it may be adjusted depending on its balance with the specific surface area of the filler per unit weight, described later.

To achieve the powder fall-off resistance of condition (1) specified in the present invention more efficiently, it is preferred that the amount of particles with particle sizes of 1.0 μm or more ($D_{1.0}$) in the filler used in the present invention be less than 20%, more preferably 15% or less, particularly preferably 12% or less. A $D_{1.0}$ of less than 20% provides a higher powder fall-off resistance.

In the present invention, "amount of particles with particle sizes of less than 0.2 μm ($D_{0.2}$)" and "amount of particles with particle sizes of 1.0 μm or more ($D_{1.0}$)" are measured by a laser diffraction/scattering particle size distribution analyzer.

In the present invention, it is also important that the specific surface area per unit weight of the filler be 5 to less than 10 $m^2/g$. The use of a filler having a specific surface area of 5 $m^2/g$ or more provides good productivity because it allows the electrolyte solution to quickly permeate the multilayer porous film of the present invention when it is incorporated as a separator into a nonaqueous electrolyte secondary battery. The use of a filler having a specific surface area of less than 10 $m^2/g$ inhibits excessive adsorption of the electrolyte component onto the multilayer porous film of the present invention when it is incorporated as a separator into a nonaqueous electrolyte secondary battery.

In this embodiment, "specific surface area per unit weight of the filler" is measured by the constant-volume gas adsorption method.

The lower limit of the average particle size of the filler is preferably 0.01 μm or more, more preferably 0.1 μm or more, even more preferably 0.2 μm or more. The upper limit is preferably 1.5 μm or less, more preferably 1.2 μm or less. An average particle size of 0.01 μm or more is preferred because it provides sufficient heat resistance for the multilayer porous film of the present invention. An average particle size of 1.5 μm or less is preferred for improved dispersibility of the filler in the coating layer.

In this embodiment, "average particle size of the filler" is determined by acquiring two-dimensional images of the filler projected in two orthogonal directions, for example, using an image analyzer, calculating the average of the major and minor axes of the image for each direction, and further calculating the average thereof.

Resin Binder

The resin binder used in the present invention may be any resin binder that provides good adhesion between the filler and the polyolefin-based resin porous film, that is electrochemically stable, and that is stable to an organic electrolyte solution when the multilayer porous film is used as a separator for nonaqueous electrolyte secondary batteries. Specifically, examples of such resin binders include polyether, polyamide, polyimide, polyamideimide, polyaramide, ethylene-vinyl acetate copolymers (those containing 0% to 20% by mole of structural units derived from vinyl acetate), ethylene-acrylic acid copolymers such as ethylene-ethyl acrylate copolymer, polyvinylidene fluoride, polyvinylidene fluoride-hexafluoropropylene, polyvinylidene fluoride-trichloroethylene, polytetrafluoroethylene, fluorocarbon rubber, styrene-butadiene rubber, nitrile-butadiene rubber, polybutadiene rubber, polyacrylonitrile, polyacrylic acid and derivatives thereof, polymethacrylic acid and derivatives thereof, carboxymethyl cellulose, hydroxyethyl cellulose, cyanoethyl cellulose, polyvinyl alcohol, cyanoethyl polyvinyl alcohol, polyvinyl butyral, polyvinyl pyrrolidone, poly-N-vinylacetamide, crosslinked acrylic resin, polyurethane, epoxy resin, and maleic acid-modified polyolefins. These resin binders may be used alone or in a combination of two or more. Among these resin binders, polyoxyethylene, polyvinyl alcohol, polyvinylidene fluoride, polyvinyl pyrrolidone, polyacrylonitrile, styrene-butadiene rubber, carboxymethyl cellulose, polyacrylic acid and derivatives thereof, and maleic acid-modified polyolefins are more preferred because they are relatively stable in water.

The content of the filler to the total amount of filler and resin binder in the coating layer is preferably 80% to 99.9% by mass. More preferably, the content of the filler is 92% by mass or more, even more preferably 95% by mass or more, particularly preferably 98% by mass or more. A content of the filler within the above range allows the coating layer to maintain superior air permeability and binding properties.

Volatile Acid

A coating liquid for forming the coating layer in the present invention, that is, a dispersion for forming the coating layer, preferably contains a volatile acid. Examples of volatile acids include acid gases such as carbonic acid, hydrogen sulfide, and sulfur dioxide gases; lower carboxylic acids such as formic acid, acetic acid, propionic acid, and acrylic acid; nitro acids such as nitric acid and nitrous acid; halogen oxo acids such as perchloric acid and hypochlorous acid; and hydrohalic acids such as hydrochloric acid, hydrofluoric acid, and hydrobromic acid. Among these, formic acid, acetic acid, and hydrochloric acid are preferred for their ability to lower the pH when added in small amounts, availability, and high acid stability.

The volatile acid preferably has a boiling point or decomposition temperature of −100° C. to 150° C., more preferably −100° C. to 120° C. A volatile acid having a boiling point or decomposition temperature of −100° C. to 150° C. has the advantage that it volatizes sufficiently during drying and thus does not adversely affects the battery.

The volatile acid is preferably present in an amount of 0.001% to 1% by mass based on 100% by mass of the coating liquid. More preferably, the content of the volatile acid is 0.01% to 0.5% by mass, even more preferably 0.05% to 0.5% by mass. If the volatile acid is present in an amount of 0.001% by mass or more based on 100% by mass of the coating liquid, the pH can be lowered to a predetermined level; if the volatile acid is present in an amount of 1% by mass or less, the material properties are not degraded because little volatile acid remains on the polyolefin-based resin porous film.

Method for Forming Coating Layer

Examples of methods for forming the coating layer of the multilayer porous film of the present invention include coextrusion, lamination, and coating processes such as coating and drying. For continuous production, the coating layer is preferably formed by coating and drying.

To form the coating layer by coating, it is preferred to use a solvent in which the filler and the resin binder can be moderately uniformly and stably dissolved or dispersed as the dispersion medium in the coating liquid, that is, the dispersion for forming the coating layer. Examples of such solvents include N-methylpyrrolidone, N,N-dimethylformamide, N,N-dimethylacetamide, water, dioxane, acetonitrile, lower alcohols, glycols, glycerol, and lactic acid esters. In particular, a dispersion medium containing water as a major component is preferred for cost and environmental reasons, and water is particularly preferred as the dispersion medium.

If the coating liquid contains a volatile acid, the coating liquid is preferably prepared such that the difference between the pH ($pH_1$) of the coating liquid and the pH ($pH_2$) of the coating layer to be formed is 0.5 or more.

If the difference between $pH_1$ and $pH_2$ is 0.5 or more, the volatile acid improves the dispersibility of the filler and, because it volatilizes, provides good powder fall-off resistance without degrading the battery characteristics when the multilayer porous film of the present invention is used as a battery separator.

If the coating layer contains a volatile acid, the coating liquid preferably has a pH ($pH_1$) of 1 to 6.5, more preferably 2 to 6.5. A lower limit of $pH_1$ of 1 or more is preferred because it sufficiently inhibits acid corrosion of coating devices. An upper limit of $pH_1$ of 6.5 or less is preferred because it ensures sufficient coating liquid stability and powder fall-off resistance due to improved dispersibility of the filler.

In this case, the pH ($pH_2$) of the coating layer is preferably, but not limited to, 6 to 8, more preferably 6.5 to 7.5, even more preferably around 7, i.e., neutral. A $pH_2$ within the predetermined range indicates that the volatile acid has volatilized, thus providing good powder fall-off resistance without degrading the battery characteristics when the multilayer porous film of the present invention is used as a battery separator.

Examples of methods for dissolving or dispersing the filler and the resin binder in the dispersion medium include mechanical stirring using ball mills, bead mills, planetary ball mills, vibrating ball mills, sand mills, colloid mills, attritors, roller mills, high-speed impeller dispersion, dispersers, homogenizers, high-speed impact mills, ultrasonic dispersion, stirring impellers, and the like.

To improve the stability of the dispersion and optimize the viscosity thereof, additives such as dispersion aids, stabilizers, and thickeners may be added before or after the filler and the resin binder are dispersed in the dispersion medium.

The coating liquid may be applied to the surface of the polyolefin-based resin porous film by any coating step. The coating liquid may be applied after extrusion and before stretching, after the longitudinal stretching step, or after the lateral stretching step.

The coating step may be performed by any coating process that provides the necessary layer thickness and coating area. Examples of such coating processes include gravure coating, microgravure coating, reverse roller coating, transfer roller coating, kiss coating, dip coating, knife coating, air doctor coating, blade coating, rod coating, squeeze coating, cast coating, die coating, screen printing, and spray coating. The coating liquid may be applied to one or both surfaces of the polyolefin-based resin porous film, depending on the purpose. That is, the multilayer porous film of the present invention may have the coating layer on one or both surfaces of the polyolefin-based resin porous film.

After the coating liquid is applied, the dispersion medium may be removed by any method that does not adversely affect the polyolefin-based resin porous film. Examples of methods for removing the dispersion medium include drying the polyolefin-based resin porous film below the melting point thereof while holding the polyolefin-based resin porous film, drying the polyolefin-based resin porous film at low temperature under reduced pressure, and extracting the solvent by dipping the polyolefin-based resin porous film in a poor solvent for the resin binder so that the resin binder coagulates.

Shape and Material Properties of Multilayer Porous Film

The multilayer porous film of the present invention preferably has a thickness of 5 to 100 μm. More preferably, the multilayer porous film of the present invention has a thickness of 8 to 50 μm, even more preferably 10 to 30 μm. A multilayer porous film with a thickness of 5 μm or more has the practical electrical insulation required for use as a separator for nonaqueous electrolyte secondary batteries and also provides superior safety because such a separator for nonaqueous electrolyte secondary batteries is resistant to tearing, which results in a short circuit, for example, when a large force acts on a protrusion of an electrode. A multilayer porous film with a thickness of 100 μm or less has low electrical resistance and thus ensures sufficient battery performance.

In terms of heat resistance, the coating layer preferably has a thickness of 0.5 μm or more, more preferably 1 μm or more, even more preferably 2 μm or more, particularly preferably 3 μm or more. In terms of interconnectivity, the upper limit of the thickness of the coating layer is preferably 90 μm or less, more preferably 50 μm or less, even more preferably 30 μm or less, particularly preferably 10 μm or less.

The multilayer porous film of the present invention preferably has a porosity of 30% or more, more preferably 35% or more, even more preferably 40% or more. A multilayer porous film with a porosity of 30% or more has sufficient interconnectivity and thus provides superior air permeation properties.

The upper limit of the porosity of the multilayer porous film is preferably 70% or less, more preferably 65% or less, even more preferably 60% or less. A multilayer porous film with a porosity of 70% or less has sufficient strength, which is preferred for handling. The porosity of the multilayer porous film is measured by the method disclosed in the Examples.

The multilayer porous film of the present invention preferably has an air resistance of 1,000 s/100 mL or less, more preferably 10 to 800 s/100 mL, even more preferably 50 to 500 s/100 mL. A multilayer porous film with an air resistance of 1,000 s/100 mL or less is preferred because it means that the multilayer porous film has interconnectivity and thus provides superior air permeation performance.

The air resistance indicates the difficulty of air passing through the film across the thickness thereof; specifically, it is expressed as the number of seconds required for 100 mL of air to pass through the film. Hence, a lower value means that the film is easier to pass through, whereas a higher value means that the film is more difficult to pass through. In other words, a lower value means that the film has a higher interconnectivity across the thickness thereof, whereas a higher value means that the film has a lower interconnectivity across the thickness thereof. The interconnectivity refers to the degree of interconnection of pores across the thickness of the film. As the air resistance of the multilayer porous film of the present invention is decreased, it can be used for a wider range of applications. For example, if the multilayer porous film of the present invention is used as a separator for nonaqueous electrolyte secondary batteries, a lower air resistance is preferred for superior battery performance because it means that lithium ions migrate more readily.

The air resistance of the multilayer porous film is measured by the method disclosed in the Examples described later.

The multilayer porous film of the present invention preferably has SD characteristics when used as a battery separator. Specifically, the multilayer porous film of the present invention preferably has an air resistance after heating at 135° C.

for 5 seconds of 10,000 s/100 mL or gore, more preferably 25,000 s/100 mL or more, even more preferably 50,000 s/100 mL or more. A multilayer porous film with an air resistance after heating at 135° C. for 5 seconds of 10,000 s/100 mL or more quickly closes its pores and thereby shuts off current in the event of abnormal heat generation, thus avoiding problems such as battery rupture.

The multilayer porous film of the present invention preferably has a shrinkage at 150° C. of less than 10%, more preferably less than 9%, even more preferably less than 8%, in each of the longitudinal direction and the lateral direction. A shrinkage at 150° C. of less than 10% suggests that the multilayer porous film maintains its dimensional stability and heat resistance in the event of abnormal heat generation above the SD temperature, which prevents failure of the film and raises the internal short circuit temperature. Although there is no lower limit to the shrinkage, it is preferably 0% or more.

The shrinkage of the multilayer porous film is measured by the method disclosed in the Examples described later.

The peel strength between the polyolefin-based resin porous film and the coating layer of the multilayer porous film of the present invention is preferably 1 N/15 mm or more, more preferably 2 N/15 mm or more. A peel strength of 1 N/15 mm or more significantly reduces the possibility of the filler coming off.

The peel strength is measured by the method disclosed in the Examples described later.

For the powder fall-off resistance of the coating layer, the multilayer porous film of the present invention is evaluated by more strict criteria than in the above peel strength test. This is because there is a need to use a multilayer porous film that lets no powder fall off under more severe conditions as a separator, taking into account the safety of nonaqueous secondary batteries.

Specifically, it is important that, after the multilayer porous film of the present invention is cut to a size of 50 mm×50 mm and is stuck on thick paper, with the coating layer to be evaluated for powder fall-off resistance facing upward, and a column-shaped weight having a diameter of 40 mm and a weight of 700 g and covered with a cotton cloth on the entire bottom surface thereof is placed on the coating layer, and the weight is rotated at a rotational speed of 50 rpm for 10 minutes to rub the surface of the coating layer, observation of the surface of the coating layer show that the coating layer has a missing portion with an area of less than 10%, preferably 8% or less, particularly preferably 6% or less, of the contact area of the weight. The contact area is determined as the area of the bottom surface of the weight covered with the cotton cloth by measuring the diameter of an approximate circle thereof.

The multilayer porous film of the present invention, satisfying the above condition, has extremely high powder fall-off resistance and thus provides safety as a separator for nonaqueous electrolyte secondary batteries.

If the multilayer porous film of the present invention has coating layers on both surfaces of the polyolefin-based resin porous film, both coating layers preferably satisfy the above powder fall-off resistance.

Battery

Next, a nonaqueous electrolyte secondary battery including the multilayer porous film of the present invention as a battery separator will be described with reference to FIG. 1.

A positive electrode sheet 21 and a negative electrode sheet 22 are wound into a spiral such that they are stacked on top of each other with a battery separator 10 therebetween, and the outer end thereof is stuck with a binding tape to form a spiral assembly.

The winding step will be described in detail. One end of the battery separator is passed through a slit in a pin, and the pin is slightly rotated to wind the end of the battery separator around the pin. The surface of the pin is in contact with the coating layer of the battery separator. The positive electrode and the negative electrode are then placed with the battery separator therebetween, and the pin is rotated by a winding machine to wind the positive and negative electrodes and the battery separator. After winding, the pin is removed from the spiral assembly.

The spiral assembly formed by winding together the positive electrode sheet 21, the battery separator 10, and the negative electrode sheet 22 is placed in a cylindrical battery case with a closed bottom and is welded to a positive electrode lead 24 and a negative electrode lead 25. The electrolyte solution is then injected into the battery case, and after the electrolyte solution sufficiently permeates the components such as the battery separator 10, the battery can is sealed with a positive electrode lid 27, with a gasket 26 disposed at the opening edge of the battery can, followed by precharge and aging, thus fabricating a cylindrical nonaqueous electrolyte secondary battery 20.

The electrolyte solution is an electrolyte solution prepared by dissolving a lithium salt as an electrolyte in an organic solvent. Examples of organic solvents include, but not limited to, esters such as propylene carbonate, ethylene carbonate, butylene carbonate, γ-butyrolactone, γ-valerolactone, dimethyl carbonate, methyl propionate, and butyl acetate; nitriles such as acetonitrile; ethers such as 1,2-dimethoxyethane, 1,2-dimethoxymethane, dimethoxypropane, 1,3-dioxolane, tetrahydrofuran, 2-methyltetrahydrofuran, and 4-methyl-1,3-dioxolane; and sulfolane, which may be used alone or as a mixture of two or more. Particularly preferred is an electrolyte solution prepared by dissolving lithium hexafluorophosphate ($LiPF_6$) to a concentration of 1.0 mol/L in a mixture of 1 part by mass of ethylene carbonate and 2 parts by mass of methyl ethyl carbonate.

The negative electrode is an electrode formed by combining an alkali metal or a compound containing an alkali metal with a current collector material such as stainless steel. Examples of alkali metals include lithium, sodium, and potassium. Examples of compounds containing an alkali metal include alloys of alkali metals with metals such as aluminum, lead, indium, potassium, cadmium, tin, and magnesium; compounds of alkali metals with carbon materials; and compounds of low-potential alkali metals with metal oxides or sulfides. If a carbon material is used in the negative electrode, the carbon material may be any carbon material that can be doped and dedoped with lithium ions, including, for example, graphite, pyrolytic carbon, coke, glassy carbon, fired organic polymer compounds, mesocarbon microbeads, carbon fiber, and activated carbon.

The negative electrode used in this embodiment is a strip-shaped negative electrode sheet formed by mixing a carbon material with an average particle size of 10 μm with a solution of polyvinylidene fluoride in N-methylpyrrolidone to prepare a slurry, passing the negative electrode mixture slurry through a 70 mesh screen to remove coarse particles, and uniformly applying and drying the negative electrode mixture slurry on both surfaces of a negative electrode current collector made of a copper foil strip with a thickness of 18 μm, followed by compression molding using a roller press and cutting.

The positive electrode is an electrode formed by molding a mixture of a positive electrode active material with, for example, a conductive aid and a binder such as polytetrafluoroethylene using a current collector material such as stainless steel as a core material, where the active material is, for example, a metal oxide such as lithium cobalt oxide, lithium nickel oxide, lithium manganese oxide, manganese dioxide, vanadium pentaoxide, or chromium oxide or a metal sulfide such as molybdenum disulfide.

The positive electrode used in this embodiment is a strip-shaped positive electrode sheet formed as follows. Specifically, lithium cobalt oxide ($LiCoO_2$) is mixed with crystalline graphite as a conductive aid in a mass ratio (lithium cobalt oxide:crystalline graphite) of 90:5, and the mixture is mixed with a solution of polyvinylidene fluoride in N-methylpyrrolidone to prepare a slurry. After the positive electrode mixture slurry is passed through a 70 mesh screen to remove coarse particles, the positive electrode mixture slurry is uniformly applied to and cried on both surfaces of a positive electrode current collector made of an aluminum foil with a thickness of 20 μm, followed by compression molding using a roller press and cutting, thus forming a strip-shaped positive electrode sheet.

EXAMPLES

The following examples and comparative examples are presented to further illustrate the multilayer porous film of the present invention, although the present invention is not limited thereto. The lengthwise direction of the multilayer porous film is referred to as "longitudinal direction", and the direction perpendicular to the lengthwise direction is referred to as "lateral direction".

(1) Filler Content

The filler content of the coating layer was determined as the proportion of the filler to the total amount of filler and resin binder in the dispersion for forming the coating layer.

(2) Solids Content

The solids content was determined as the proportion of the total amount of filler and resin binder based on 100% by mass of the dispersion for forming the coating layer.

(3) Amount of Particles with Particle Sizes of Less than 0.2 μm ($D_{0.2}$)

The amount of particles with particle sizes of less than 0.2 μm ($D_{0.2}$) was determined by a laser diffraction/scattering particle size distribution analyzer.

(4) Amount of Particles with Particle Sizes of 1.0 μm or More ($D_{1.0}$)

The amount of particles with particle sizes of 1.0 μm or more ($D_{1.0}$) was determined by a laser diffraction/scattering particle size distribution analyzer.

(5) Electrolyte Solution Adsorptivity

The specific surface area per unit weight of the filler was measured by the constant-volume gas adsorption method and was evaluated on the following scale:

Good: The specific surface area was 5 to less than 10 $m^2/g$.

Poor: The specific surface area was less than 5 $m^2/g$ or was not less than 10 $m^2/g$.

(6) Total Thickness ($T_a$)

The total thickness ($T_a$) (μm) of the multilayer porous film was determined as the average thickness measured at any five points in the surface of the multilayer porous film using a 1/1,000 mm dial gauge.

(7) Thickness of Coating Layer ($T_c$)

The thickness ($T_c$) (μm) of the coating layer was determined as the difference between the total thickness ($T_a$) (μm) of the multilayer porous film after the formation of the coating layer and the thickness ($T_b$) (μm) of the polyolefin-based resin porous film.

(8) Air Resistance (Gurley Value)

The air resistance was measured in accordance with JIS P8117.

(9) Porosity

The multilayer porous film after the formation of the coating layer and the polyolefin-based resin porous film were cut into a circle with a diameter of 4 cm, and the total weight W (mg) was measured. The true densities of the materials of the samples were then calculated from the compositions thereof to determine the true density $\rho_b$ ($g/cm^3$) of the polyolefin-based resin layer and the true density $\rho_c$ ($g/cm^3$) of the coating layer, and the porosity was calculated by the following equation:

$$Porosity(\%) = 100 - W/(T_b \times 0.01256 \times \rho_b + T_c \times 0.01256 \times \rho_c)$$

(10) Powder Fall-Off Resistance

After the multilayer porous film was cut to a size of 50 mm×50 mm and was stuck on thick paper in a state where the coating layer facing upward, and a column-shaped weight having a diameter of 40 mm and a weight of 700 g and covered with a cotton cloth (available from Tanaka Corporation, trade name: "Cotton Knit Fabric", weight: 188 $g/m^2$, thickness: 550 μm) on the entire bottom surface thereof was placed on the coating layer, and the weight was rotated at a rotational speed of 50 rpm for 10 minutes to rub the surface of the coating layer, the surface of the coating layer was observed and was evaluated for powder fall-off resistance on the following scale.

The cotton cloth was stuck to the bottom surface of the weight with a double-sided tape without slack. The contact area of the weight was determined as the area of the bottom surface of the weight covered with the cotton cloth by measuring the diameter of an approximate circle thereof.

Good: The coating layer had a missing portion with an area of less than 10% of the contact area of the weight.

Poor: The coating layer had a missing portion with an area of 10% or more of the contact area of the weight.

(11) Peel Strength

Figure 3:
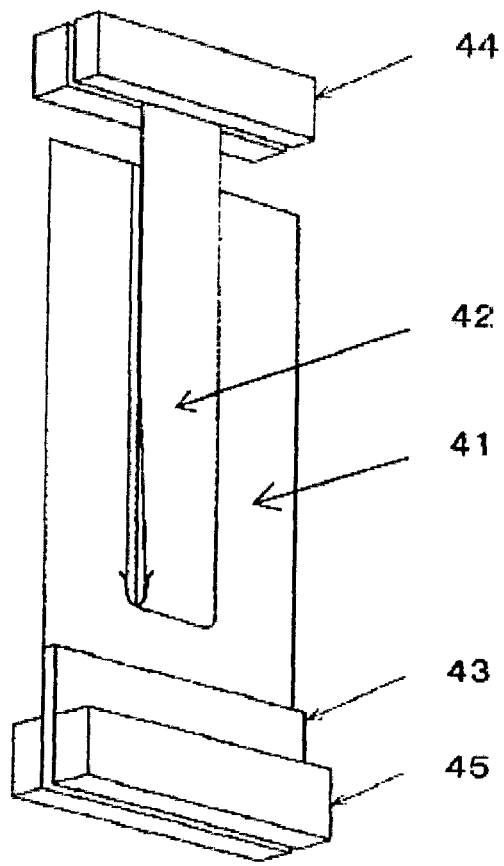
FIG. 3 illustrates a method for measuring peel strength.

The peel strength between the polyolefin-based resin porous film and the coating layer was measured by the method illustrated in FIG. 3 in accordance with JIS Z0237. The multilayer porous film was first cut to a width of 50 mm and a length of 150 mm as a sample 41, and a cellophane tape (15 mm wide, available from Nichiban Co., Ltd., JIS Z1522) was stuck as a tape 42 to the sample 41 in the longitudinal direction thereof. The tape 42 was folded back 180° with the back surface thereof inside and was removed from the sample 41 by a length of 25 mm. The end of the portion of the sample 41 from which the tape 42 was removed was then secured to a lower chuck 45 of a tensile tester (INTESCO IM-20ST available from INTESCO Co., Ltd.) with an antislip pad 43 therebetween. The tape was secured to an upper chuck 44, and the peel strength was measured at a test speed of 300 mm/min. After the measurement, the average peel strength of the portion removed from the test piece by a length of 50 mm was calculated as the peel strength, where the measurement of the portion initially removed by a length of 25 mm was ignored. A peel strength of 1 N/15 mm or more is satisfactory.

(12) Coatability

The coatability of the coating liquid was evaluated on the following scale:

Excellent: Coating was possible. Visual inspection revealed that a good coating containing no aggregated particles was formed.

Good: Coating was possible. Visual inspection revealed that the coating contained a small amount of aggregated particles.

Poor: Coating was difficult because the coating contained a large amount of aggregated particles.

(13) Shrinkage at 150° C.

A sample prepared by cutting the multilayer porous film to a size of 150 mm×10 mm was marked such that the chuck-to-chuck distance was 100 mm, was placed in an oven (Tabai GPH200 Geer oven available from Tabai ESPEC Corp.) set to 150° C., and was left standing for 1 hour. After the sample was removed from the oven and was cooled, the length (mm) was measured, and the shrinkage was calculated by the following equation:

Shrinkage(%)=[(100−length after heating)/100]×100

The above measurement was performed in each of the longitudinal direction and the lateral direction of the multilayer porous film.

(14) Heat Resistance

The heat resistance was evaluated on the following scale:

Good: The shrinkage at 150° C. after 1 hour was less than 10% in each of the longitudinal direction and the lateral direction.

Poor: The shrinkage at 150° C. after 1 hour was 10% or more in the longitudinal direction or the lateral direction.

(15) Differential Scanning Calorimetry (DSC)

Using a differential scanning calorimeter (DSC-7) available from PerkinElmer Inc., 10 mg of a sample of the multilayer porous film was heated from 25° C. to 240° C. at a heating rate of 10° C./min in a nitrogen atmosphere and maintained at this temperature for 1 minute, was cooled from 240° C. to 25° C. at a cooling rate of 10° C./min and maintained at this temperature for 1 minute, and was reheated from 25° C. to 240° C. at a heating rate of 10° C./min. The presence or absence of β-crystal activity was evaluated according to whether a peak was detected in the range of 145° C. to 150° C., i.e., the crystal melting peak temperature (Tmβ) derived from β-crystals of the polypropylene-based resin, during reheating on the following scale:

Good: Tmβ was detected in the range of 145° C. to 160° C. (β-crystal activity was determined).

Poor: No Tmβ was detected in the range of 145° C. to 160° C. (no β-crystal activity was determined).

(16) Wide-Angle X-Ray Diffractometry (XRD)

Figure 2:
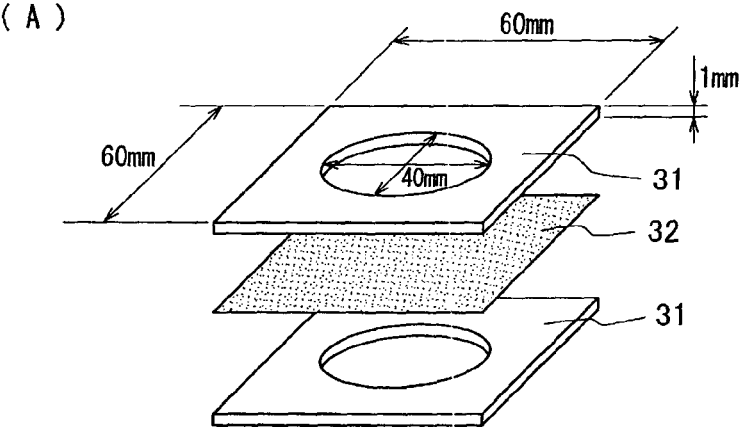
FIG. 2 illustrates a method for holding a multilayer porous film in wide-angle X-ray diffractometry.
Figure 2:
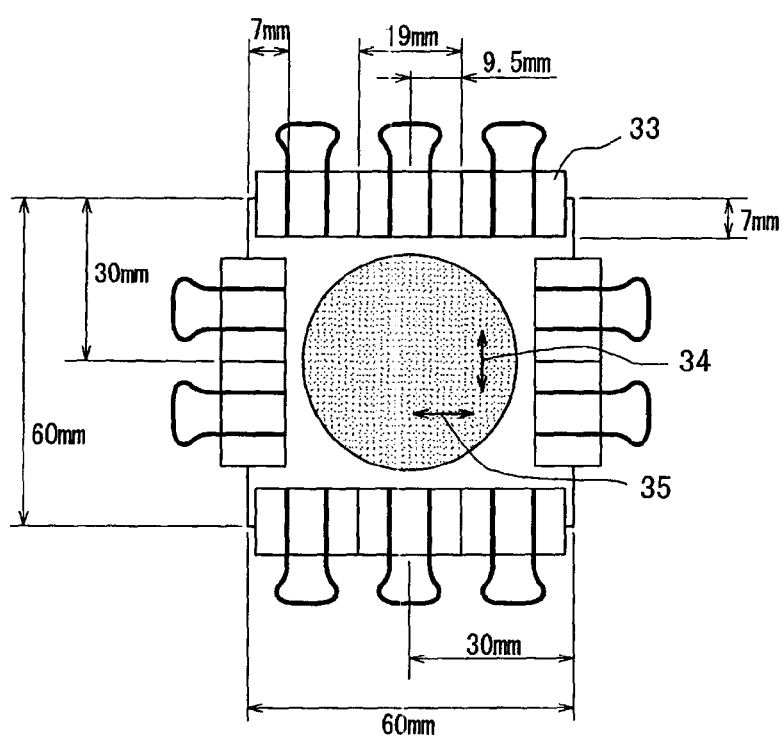

As shown in FIG. 2(A), a sample 32 prepared by cutting the multilayer porous film to a length of 60 mm and a width of 60 mm was held between two aluminum plates (material: JIS A5052, size: 60 mm long, 60 mm wide, 1 mm thick) 31 and 31 having a circular hole with a diameter of 40 mm in the center thereof, and the periphery thereof was fastened with clips 33 as shown in FIG. 2(B).

The sample 32 of the multilayer porous film held between the two aluminum plates 31 and 31 was placed in a forced-circulation constant-temperature oven (available from Yamato Scientific Co., Ltd., model: DKN602) at a set temperature of 180° C. and a displayed temperature of 180° C. for 3 minutes. The set temperature was then changed to 100° C. to gradually cool the sample 32 to 100° C. over not less than 10 minutes. When the displayed temperature reached 100° C., the sample 32 was removed and was cooled in an atmosphere at 25° C. for 5 minutes while being held between the two aluminum plates 31 and 31. Wide-angle X-ray diffractometry was performed on the circular portion with a diameter of 40 mm in the center under the following measurement conditions. In FIG. 2(B), 34 indicates the longitudinal direction of the film, and 35 indicates the lateral direction of the film.

Wide-angle X-ray diffractometer: available from Mac Science, model: XMP18A
X-ray source: Cu—Kα line, power: 40 kV, 200 mA
Scan method: 2θ/θ scan
2θ range: 5° to 25°
Step size: 0.05°
Scan rate: 5°/min The presence or absence of β-crystal activity was evaluated from a peak derived from the (300) plane of β-crystals of the polypropylene-based resin in the resulting diffraction profile as follows:

Good: A peak was detected in the range 2θ=16.0° to 16.5° (β-crystal activity was determined).

Poor: No peak was detected in the range 2θ=16.0° to 16.5° (no β-crystal activity was determined).

If the multilayer porous film cannot be cut to a length of 60 mm and a width of 60 mm, the size of the sample may be adjusted such that the sample is held in the circular hole with a diameter of 40 mm in the center of the aluminum plates.

(17) pH of Coating Liquid ($pH_1$)

The pH of the coating liquid was determined in steps of 0.5 by placing a drop of the coating liquid on pH indicator paper and visually checking the resulting color.

(18) pH of Coating Layer ($pH_2$)

The pH of the coating liquid was determined in steps of 0.5 by placing a drop of ion exchange water on pH indicator paper, rubbing the coating liquid with the pH indicator paper, and visually checking the resulting color.

Preparation of Polyolefin-Based Resin Porous Film

A polypropylene-based resin (Prime Polypro F300SV available from Prime Polymer Co., Ltd., density: 0.90 g/cm³, MFR: 3.0 g/10 min) and, as a β-crystal nucleating agent, 3,9-bis[4-(N-cyclohexylcarbamoyl)phenyl]-2,4,8,10-tetraoxaspiro[5.5]undecane were provided. These raw materials were blended such that the amount of β-crystal nucleating agent was 0.2 part by mass based on 100 parts by mass of the polypropylene-based resin. The blend was charged into a co-rotating twin-screw extruder (bore diameter: 40 mm, L/D: 32) available from Toshiba Mazhine Co., Ltd. and was melt-compounded at a set temperature of 300° C. The resulting strand was solidified by cooling in a water bath and was cut by a pelletizer to prepare pellets of a polypropylene-based resin composition.

Using the pellets, a melt was extruded from a die of a T-die extruder and was solidified by cooling on a casting roller at 124° C. to prepare a raw-film. The β-crystal fraction of the raw-film was 80% as determined by the method using DSC described above.

The raw-film was stretched to 4.6 times in the longitudinal direction at 100° C. using a longitudinal stretching machine, was stretched to 2.1 times in the lateral direction at 150° C. using a lateral stretching machine, and was heat-set at 153° C.

The film was then subjected to corona surface treatment at a power of 0.4 kW and a speed of 10 m/min using a CP1 generator available from Vetaphone A/S to obtain a polyolefin-based resin porous film.

Example 1

In 60.0 parts by mass of water were dispersed 39.4 parts by mass of alumina (AHP-200 available from Nippon Light Metal Co., Ltd., average particle size: 0.4 μm, specific surface area: 6.1 m²/g, $D_{0.2}$ and $D_{1.0}$ are as shown in Table 1) and 0.6 part by mass of polyvinyl alcohol (PVA-124 available from Kuraray Co., Ltd., degree of saponification: 98.0 to 99.0, average degree of polymerization: 2,400). The coating liquid had a solids content of 40% and a pH ($pH_1$) of 7.0.

The resulting coating liquid was applied to the polyolefin-based resin porous film using a bar coater with a coating weight of #10 and was dried at 60° C. for 2 minutes.

The resulting multilayer porous film was evaluated for material properties, and the results are summarized in Table 1.

Comparative Example 1

In 60.0 parts by mass of water were dispersed 39.4 parts by mass of alumina (LS-235C available from Nippon Light Metal Co., Ltd., average particle size: 0.5 μm, specific surface area: 6.5 m$^2$/g, $D_{0.2}$ and $D_{1.0}$ are as shown in Table 1) and 0.6 part by mass of polyvinyl alcohol (PVA-124 available from Kuraray Co., Ltd., degree of saponification: 98.0 to 99.0, average degree of polymerization: 2,400). Hydrochloric acid was then added as a volatile acid in an amount of 0.07% by mass based on 100% by mass of the coating liquid. The coating liquid had a solids content of 40% and a pH ($pH_1$) of 4.5.

The resulting coating liquid was applied to the polyolefin-based resin porous film using a bar coater with a coating weight of #10 and was dried at 60° C. for 2 minutes.

The resulting multilayer porous film was evaluated for material properties, and the results are summarized in Table 1.

Comparative Example 2

In 60.0 parts by mass of water were dispersed 39.4 parts by mass of alumina (RA-40 available from Iwatani Chemical Industry Co., Ltd., average particle size: 1.0 μm, specific surface area: 3.0 m$^2$/g, $D_{0.2}$ and $D_{1.0}$ are as shown in Table 1) and 0.6 part by mass of polyvinyl alcohol (PVA-124 available from Kuraray Co., Ltd., degree of saponification: 98.0 to 99.0, average degree of polymerization: 2,400). The coating liquid had a solids content of 40% and a pH ($pH_1$) of 7.0.

The resulting coating liquid was applied to the polyolefin-based resin porous film using a bar coater with a coating weight of #10 and was dried at 60° C. for 2 minutes.

The resulting multilayer porous film was evaluated for material properties, and the results are summarized in Table 1.

Comparative Example 3

In 60.0 parts by mass of water were dispersed 39.4 parts by mass of alumina (SA-1 available from Iwatani Chemical Industry Co., Ltd., average particle size: 0.6 μm, specific surface area: 4.0 m$^2$/g, $D_{0.2}$ and $D_{1.0}$ are as shown in Table 1) and 0.6 part by mass of polyvinyl alcohol (PVA-124 available from Kuraray Co., Ltd., degree of saponification: 98.0 to 99.0, average degree of polymerization: 2,400). The coating liquid had a solids content of 40% and a pH ($pH_1$) of 7.0.

The resulting coating liquid was applied to the polyolefin-based resin porous film using a bar coater with a coating weight of #10 and was dried at 60° C. for 2 minutes.

The resulting multilayer porous film was evaluated for material properties, and the results are summarized in Table 1.

Comparative Example 4

In 60.0 parts by mass of water were dispersed 39.4 parts by mass of alumina (LS-410 available from Nippon Light Metal Co., Ltd., average particle size: 0.5 μm, specific surface area: 7.3 m$^2$/g, $D_{0.2}$ and $D_{1.0}$ are as shown in Table 1) and 0.6 part by mass of polyvinyl alcohol (PVA-124 available from Kuraray Co., Ltd., degree of saponification: 98.0 to 99.0, average degree of polymerization: 2,400). The coating liquid had a solids content of 40% and a pH ($pH_1$) of 7.0.

The resulting coating liquid was applied to the polyolefin-based resin porous film using a bar coater with a coating weight of #10 and was dried at 60° C. for 2 minutes.

The resulting multilayer porous film was evaluated for material properties, and the results are summarized in Table 1.

Comparative Example 5

In 60.0 parts by mass of water were dispersed 39.4 parts by mass of alumina (ASFP-20 available from Denki Kagaku Kogyo Kabushiki Kaisha, average particle size: 0.2 μm, specific surface area: 12.5 m$^2$/g, $D_{0.2}$ and $D_{1.0}$ are as shown in Table 1) and 0.6 part by mass of polyvinyl alcohol (PVA-124 available from Kuraray Co., Ltd., degree of saponification: 98.0 to 99.0, average degree of polymerization: 2,400). The coating liquid had a solids content of 40% and a pH ($pH_1$) of 7.0.

The resulting coating liquid was applied to the polyolefin-based resin porous film using a bar coater with a coating weight of #10 and was dried at 60° C. for 2 minutes.

The resulting multilayer porous film was evaluated for material properties, and the results are summarized in Table 1.

Comparative Example 6

The polyolefin-based resin porous film was evaluated for material properties, and the results are summarized in Table 1.

TABLE 1

| | | | Example 1 | Comparative Example 1 | Comparative Example 2 | Comparative Example 3 | Comparative Example 4 | Comparative Example 5 | Comparative Example 6 |
|---|---|---|---|---|---|---|---|---|---|
| Filler content of coating layer | | % | 98.5 | 98.5 | 98.5 | 98.5 | 98.5 | 98.5 | — |
| Particle size of filler | Average particle size | μm | 0.4 | 0.5 | 1.0 | 0.6 | 0.5 | 0.2 | — |
| | Amount of particles with particle sizes of less than 0.2 μm ($D_{0.2}$) | % | 13 | <1 | <1 | <1 | <1 | 20 | — |
| | Amount of particles with particle sizes of 1.0 μm or more ($D_{1.0}$) | % | 12 | 23 | 92 | 26 | 11 | <1 | — |
| Electrolyte solution adsorptivity | | — | Good | Good | Good | Good | Good | Poor | — |
| pH of coating liquid ($pH_1$) | | — | 7.0 | 4.5 | 7.0 | 7.0 | 7.0 | 7.0 | — |
| pH of coating layer ($pH_2$) | | — | 7.0 | 7.0 | 7.0 | 7.0 | 7.0 | 7.0 | — |
| Difference between $pH_1$ and $pH_2$ | | — | 0.0 | 2.5 | 0.0 | 0.0 | 0.0 | 0.0 | — |
| Total thickness of multilayer porous film ($T_a$) | | μm | 25 | 26 | 31 | 25 | 26 | 24 | 20 |
| Thickness of coating layer ($T_c$) | | μm | 5 | 6 | 11 | 5 | 6 | 4 | — |
| Air resistance | | s/100 mL | 189 | 184 | 197 | 179 | 182 | 183 | 165 |
| Porosity | | % | 55 | 54 | 71 | 53 | 52 | 52 | 55 |
| Powder fall-off resistance | | — | Good | Poor | Poor | Poor | Poor | Good | — |
| Peel strength | | N/15 mm | 2.8 | 3.2 | <0.1 | 3.4 | 2.9 | 3.1 | — |

TABLE 1-continued

|  |  |  | Example 1 | Comparative Example 1 | Comparative Example 2 | Comparative Example 3 | Comparative Example 4 | Comparative Example 5 | Comparative Example 6 |
|---|---|---|---|---|---|---|---|---|---|
| Coatability |  | — | Excellent | Excellent | Excellent | Excellent | Excellent | Excellent | — |
| Shrinkage at 150° C. | Longitudinal direction | % | 5 | 3 | 7 | 3 | 4 | 3 | 8 |
|  | Lateral direction | % | 4 | 4 | 17 | 3 | 5 | 3 | 10 |
| Heat resistance |  | — | Good | Good | Poor | Good | Good | Good | Poor |
| DSC |  | — | Good | Good | Good | Good | Good | Good | Good |
| XRD |  | — | Good | Good | Good | Good | Good | Good | Good |

As shown in Table 1, the multilayer porous film of the present invention prepared in Example 1 had extremely high powder fall-off resistance as well as superior electrolyte solution adsorptivity, heat resistance, and air permeation properties.

In contrast, the multilayer porous films prepared in Comparative Examples 1 to 4 had insufficient powder fall-off resistance as evaluated by a strict test because the fillers used for their coating layers contained extremely smaller amounts of particles with particle sizes of less than 0.2 μm ($D_{0.2}$) than that in Example 1. The multilayer porous film prepared in Comparative Example 2 exhibited particularly poor adhesion and had insufficient peel strength, powder fall-off resistance, and heat resistance because the filler used for its coating layer contained an extremely large amount of particles with particle sizes of 1.0 μm or more ($D_{1.0}$).

The multilayer porous film prepared in Comparative Example 5 had satisfactory powder fall-off resistance, although it exhibited excessive electrolyte adsorption because the filler had a large specific surface area than that in Example 1.

The polyolefin-based resin porous film of Comparative Example 6 had insufficient heat resistance because it had no coating layer.

Industrial Applicability

The multilayer porous film of the present invention is applicable to various applications requiring air permeation properties and heat resistance. The multilayer porous film is extremely suitable as materials such as separators for lithium-ion secondary batteries; sanitary materials such as body-fluid absorbing pads, including disposable diapers and feminine hygiene products, and bed sheets; medical materials such as surgical coats and substrates for hot compresses; materials for clothing such as jackets, sportswear, and rainwear; building materials such as wallpaper, roof waterproof materials, heat insulation materials, and sound-absorbing materials; desiccants; moisture absorbents; oxygen absorbers; disposable body warmers; and packaging materials such as freshness-keeping packaging and food packaging.

Although the present invention has been described in detail with reference to particular embodiments, it will be apparent to those skilled in the art that various modifications are possible without departing from the spirit and scope of the present invention.

The present application is based on Japanese Patent Application 2012-070032 filed on Mar. 26, 2012, the entire content of which is incorporated herein by reference.

The invention claimed is:

1. A multilayer porous film, comprising:
   a polyolefin-based resin porous film, and
   a coating layer comprising a filler and a resin binder on at least one surface of the polyolefin-based resin porous film,
   wherein the filler has an average particle size from 0.2-1.5 μm and comprises particles with particles sizes of less than 0.2 μm and particles with particles sizes of 1.0 μm or more,
   wherein the particles with particle sizes of less than 0.2 μm ($D_{0.2}$) in the filler are present and present in an amount of 5% or more, and the particles with particle sizes of 1.0 μm or more ($D_{1.0}$) in the filler are present and present in an amount of 20% or less,
   wherein a specific surface area of the filler is 5 $m^2$/g or more and less than 10 $m^2$/g, and
   wherein the multilayer porous film satisfies a condition (1):
   condition (1): after the multilayer porous film is cut to a size of 50 mm ×50 mm and is stuck on paper in a state where the coating layer faces upward, a column-shaped weight having a diameter of 40 mm and a weight of 700 g and covered with a cotton cloth on an entire bottom surface thereof is placed on the coating layer, and the weight is rotated at a rotational speed of 50 rpm for 10 minutes to rub the surface of the coating layer, observation of the surface of the coating layer shows that the coating layer has a missing portion with an area of less than 10% of a contact area of the weight.

2. The multilayer porous film of claim 1, wherein the filler comprises a metal oxide.

3. The multilayer porous film of claim 2, wherein the resin binder is at least one selected from the group consisting of polyvinyl alcohol, polyvinylidene fluoride, carboxymethyl cellulose, polyacrylic acid, and a polyacrylic acid derivative.

4. The multilayer porous film of claim 3, wherein a content of the filler to a total amount of filler and resin binder in the coating layer is from 80% to 99.9% by mass.

5. The multilayer porous film of claim 2, wherein a content of the filler to a total amount of filler and resin binder in the coating layer is from 80% to 99.9% by mass.

6. The multilayer porous film of claim 2, wherein the polyolefin-based resin porous film comprises a polypropylene-based resin.

7. The multilayer porous film of claim 1, wherein the resin binder is at least one selected from the group consisting of polyvinyl alcohol, polyvinylidene fluoride, carboxymethyl cellulose, polyacrylic acid, and a polyacrylic acid derivative.

8. The multilayer porous film of claim 7, wherein a content of the filler to a total amount of filler and resin binder in the coating layer is from 80% to 99.9% by mass.

9. The multilayer porous film of claim 7, wherein the polyolefin-based resin porous film comprises a polypropylene-based resin.

10. The multilayer porous film of claim 1, wherein a content of the filler to a total amount of filler and resin binder in the coating layer is from 80% to 99.9% by mass.

11. The multilayer porous film of claim 10, wherein the polyolefin-based resin porous film comprises a polypropylene-based resin.

12. The multilayer porous film of claim 1, wherein the polyolefin-based resin porous film comprises a polypropylene-based resin.

13. The multilayer porous film of claim 1, wherein the polyolefin-based resin porous film has β-crystal activity.

14. The multilayer porous film of claim 1, wherein the coating layer is formed on the polyolefin-based resin porous film by a method comprising applying a dispersion to the polyolefin-based resin porous film.

15. The multilayer porous film of claim 14, wherein a dispersion medium in the dispersion comprises water as a major component.

16. The multilayer porous film of claim 1, wherein the amount of particles with particles sizes of less than 0.2 μm ($D_{0.2}$) in the filler is 10% or more and the amount of particles with particles sizes of 1.0 μm or more ($D_{1.0}$) in the filler is 15% or less.

17. A separator comprising the multilayer porous film of claim 1.

18. A nonaqueous electrolyte secondary battery comprising the separator of claim 17.

* * * * *